(12) United States Patent
Tobita et al.

(10) Patent No.: US 7,079,405 B2
(45) Date of Patent: Jul. 18, 2006

(54) THERMAL CONDUCTIVE POLYMER MOLDED ARTICLE AND METHOD FOR PRODUCING THE SAME

(75) Inventors: Masayuki Tobita, Isesaki (JP); Toru Kimura, Funabashi (JP); Naoyuki Shimoyama, Saitama (JP); Tsukasa Ishigaki, Saitama (JP)

(73) Assignee: Polymatech Co., Ltd., Tokyo (JP)

( * ) Notice: Subject to any disclaimer, the term of this patent is extended or adjusted under 35 U.S.C. 154(b) by 0 days.

(21) Appl. No.: 10/617,517

(22) Filed: Jul. 11, 2003

(65) Prior Publication Data

US 2004/0048054 A1 Mar. 11, 2004

(30) Foreign Application Priority Data

Jul. 11, 2002 (JP) .................................. 2002-202550

(51) Int. Cl.
*H02M 3/335* (2006.01)

(52) U.S. Cl. ..................... 363/21.1; 363/21.07; 323/207
(58) Field of Classification Search ................ 363/21.1, 363/21.07, 41; 323/207
See application file for complete search history.

(56) References Cited

U.S. PATENT DOCUMENTS

| | | | | |
|---|---|---|---|---|
| 5,847,039 A | * | 12/1998 | Nagashima et al. | 524/432 |
| 5,903,452 A | * | 5/1999 | Yang | 363/97 |
| 6,154,028 A | * | 11/2000 | Bushida et al. | 324/253 |
| 6,730,731 B1 | * | 5/2004 | Tobita et al. | 524/495 |

FOREIGN PATENT DOCUMENTS

| | | |
|---|---|---|
| JP | 62-100577 | 5/1987 |
| JP | 63-242513 A | 10/1988 |
| JP | 4-139222 A | 5/1992 |
| JP | 4-140115 A | 5/1992 |
| JP | 5-271465 | 10/1993 |
| JP | 11-323162 A | 11/1999 |
| JP | 2001-523892 | 11/2001 |

OTHER PUBLICATIONS

Valtriani et al., "New PET–Based Liquid Crystalline Copolyesters and Their Use In Blends and Composites", Macromol. Chem. Phys. 2001, 202, pp. 2202–2212.*

* cited by examiner

*Primary Examiner*—Shawn Riley
(74) *Attorney, Agent, or Firm*—Fish & Richardson P.C.

(57) ABSTRACT

A thermal conductive polymer molded article is formed by molding a thermotropic liquid crystalline composition comprised mainly of a thermotropic liquid crystalline polymer, wherein the thermal conductive polymer molded article is formed by applying a magnetic field or an electric field to the thermotropic liquid crystalline composition melted by heating so that the thermal conductive polymer molded article has a first thermal conductivity ($\lambda_1$) higher than a second thermal conductivity ($\lambda_2$) of a molded article formed by molding the thermotropic liquid crystalline polymer without the application of the field. The thermal conductive polymer molded article preferably has a first thermal conductivity ($\lambda_1$) of between 0.7 and 20 W/(m·K). Preferably, the thermotropic liquid crystalline polymer comprises at least one polymer selected from (A) a wholly aromatic polyester and (B) a wholly aromatic polyester amide.

13 Claims, 2 Drawing Sheets

THERMAL CONDUCTIVE POLYMER MOLDED ARTICLE AND METHOD FOR PRODUCING THE SAME

BACKGROUND OF THE INVENTION

The present invention relates to a thermal conductive polymer molded article and a method for producing the same. More particularly, the present invention concerns a thermal conductive polymer molded article that can satisfactorily utilize advantageous features of a thermotropic liquid crystalline polymer including electrical insulation properties and low density, and that can achieve excellent thermal conductivity, and a method for producing the same.

In recent years, the integration degree and speed in LSIs have increased, in accordance with a trend toward high performance, downsizing, and reduction in weight of electronic equipments, and the mounting density in semiconductor packages. Accordingly, the heat generated by various electronic parts has increased, and measures for dissipating heat out of the electronic parts become a very important task. For achieving this task, a thermally conductive molded article comprised of a heat-radiating material, such as a metal, ceramic, or a polymer composition, is used in printed circuit boards, semiconductor packages, housings, and heat-radiating members, such as heat pipes, radiating panels, and heat diffusion panels.

Among these radiating members, a thermally conductive molded article comprised of a polymer composition (hereinafter referred to as "thermally conductive polymer molded article") is easily molded into a desired shape and lightweight, and hence is widely used.

A polymer composition constituting a thermally conductive polymer molded article is known in the art that comprises a thermally conductive filler having a high thermal conductivity and which is incorporated in a polymer matrix such as a resin or a rubber. Examples of thermally conductive fillers include metal oxides, such as aluminum oxide, magnesium oxide, zinc oxide, and quartz; metal nitrides, such as boron nitride and aluminum nitride; metal carbides, such as silicon carbide; metal hydroxides, such as aluminum hydroxide; metals, such as gold, silver, and copper; carbon fibers; and graphite.

In an application that requires high heat resistance without deformation of the radiating member under high temperature conditions during mounting of electronic parts or when being used, a polymer composition and a thermally conductive polymer molded article using as a matrix a thermotropic liquid crystalline polymer have been proposed. Such thermotropic liquid crystalline polymer has excellent moldability and excellent heat resistance. For example, Japanese Laid-open Patent Publication No. 62-100577 discloses a composition, having excellent thermal conductivity, comprising a specific thermally conductive filler and a thermotropic liquid crystalline polymer. Japanese Laid-open Patent Publication No. 5-271465 discloses an electrical insulating composition having excellent thermal conductivity, which comprises 50 to 90% by weight of zircon as a thermally conductive filler and 50 to 10% by weight of a thermotropic liquid crystalline polymer. Further, Japanese National Phase Laid-open Publication No. 2001-523892 discloses a composition comprising 20 to 80% by weight of thermally conductive filler, such as carbon fibers, and 80 to 20% by weight of a thermotropic liquid crystalline polymer.

However, the conventional thermal conductive polymer composition contains a large amount of thermal conductive filler, in addition to the thermotropic liquid crystalline polymer, and has a problem in that the thermal conductive filler inhibits the thermotropic liquid crystalline polymer from exhibiting excellent features, such as electrical insulation properties and low density.

BRIEF SUMMARY OF THE INVENTION

The present invention has been made with a view to solving the above-mentioned problems accompanying the prior art. An object of the present invention is to provide a thermal conductive polymer molded article that can satisfactorily utilize advantageous features of a thermotropic liquid crystalline polymer including electrical insulation properties and low density, and has excellent thermal conductivity, and a method for producing the same.

BRIEF DESCRIPTION OF THE SEVERAL VIEWS OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
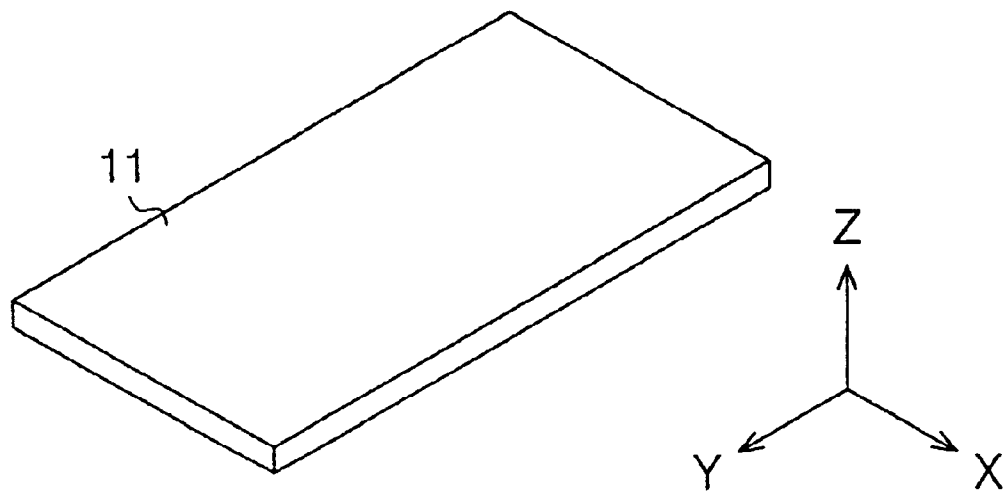
FIG. 1 is a perspective view of a thermally conductive polymer molded article according to one embodiment of the present invention.

Herein below, the embodiments of the present invention will be described in detail.

The thermal conductive polymer molded article according to the present embodiment of the present invention is a molded article that is obtained from a thermotropic liquid crystalline composition comprised mainly of a thermotropic liquid crystalline polymer. This thermal conductive polymer molded article is formed by placing the thermotropic liquid crystalline composition melted by heating in a magnetic field or an electric field so that the rigid molecular chains of the thermotropic liquid crystalline polymer are oriented in a predetermined direction. The thermal conductive polymer molded article has a thermal conductivity ($\lambda_1$) higher than a thermal conductivity ($\lambda_2$) of a molded article formed by simply molding the thermotropic liquid crystalline polymer.

First, the thermotropic liquid crystalline composition is described.

The thermotropic liquid crystalline polymer, which is a primary component of the thermotropic liquid crystalline composition, is a polymer having thermoplasticity. This polymer is called thermotropic liquid crystalline polymer, and it becomes in a liquid crystalline state exhibiting optical anisotropy when melted by heating and the temperature is allowed to fall in a certain temperature range. In the thermotropic liquid crystalline polymer in a liquid crystalline state, the molecular chains of the polymer are orderly oriented to exhibit optical anisotropy. The optical anisotropy can be confirmed by a general polarization inspection method utilizing orthogonal polarizer.

The thermotropic liquid crystalline polymer has a plurality of molecular chains, which are long, narrow, and flat, and have high rigidity. The molecular chains are coaxial or parallel to one another, and are bonded together through chain extension bonding.

Specific examples of thermotropic liquid crystalline polymers include thermotropic liquid crystalline polyesters, polyester amides, polyester ethers, polyester carbonates, and polyester imides. The thermotropic liquid crystalline polymers include main-chain type, side-chain type, and combined type thermotropic liquid crystalline polymers. The main-chain type thermotropic liquid crystalline polymer has a mesogen group, which exhibits a liquid crystalline structure, in the main chain. Examples of main-chain type thermotropic liquid crystalline polymers include polyester copolymers (e.g., copolymers of polyethylene terephthalate and hydroxybenzoic acid) and copolymers of hydroxynaphthoic acid and hydroxybenzoic acid. The side-chain type thermotropic liquid crystalline polymer has a mesogen group in the side chain. More specifically, the side-chain type thermotropic liquid crystalline polymer comprises a repeating unit wherein a mesogen group as a side chain is connected to an ethylene or siloxane main chain. The combined type thermotropic liquid crystalline polymer comprises a combination of the main-chain type and sidechain type thermotropic liquid crystalline polymers.

As examples of thermotropic liquid crystalline polyesters, there can be mentioned wholly aromatic polyesters (A). The wholly aromatic polyester means generally an ester of an aromatic carboxylic acid and an aromatic alcohol. The wholly aromatic polyester in the present embodiment can have segments that do not constitute the optical anisotropic molten phase and that are comprised of an ester of aliphatic or alicyclic acid and alcohol. In the wholly aromatic polyester in the present embodiment, when the wholly aromatic polyester itself constitutes the optical anisotropic molten phase, it can be comprised of an ester of aliphatic or alicyclic acid and alcohol. Further, in the wholly aromatic polyester in the present embodiment, when the segments constitute the optical anisotropic molten phase, the segments can be comprised of an ester of aliphatic or alicyclic acid and alcohol.

Examples of constituents of the wholly aromatic polyester include (a) aromatic dicarboxylic acid compounds, and alicyclic dicarboxylic acid compounds, (b) aromatic hydroxycarboxylic acid compounds, (c) aromatic diol, alicyclic diol, and aliphatic diol compounds, (d) aromatic dithiol, aromatic thiophenol, and aromatic thiolcarboxylic acid compounds, and (e) aromatic hydroxyamine and aromatic diamine compounds. Among these constituents (a) to (e), one constituent may be solely used, however, generally, an arbitrary number of constituents selected from (a) to (e) can be used in combination.

As examples of aromatic dicarboxylic acid compounds (a), there can be mentioned aromatic dicarboxylic acids and derivatives thereof. Examples of aromatic dicarboxylic acids include terephthalic acid, 4,4'-diphenyldicarboxylic acid, 4,4'-triphenyldicarboxylic acid, 2,6-naphthalenedicarboxylic acid, 1,4-naphthalenedicarboxylic acid, 2,7-naphthalenedicarboxylic acid, diphenyl ether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenylethane-3,3'-dicarboxylic acid, and 1,6-naphthalenedicarboxylic acid. Examples of aromatic dicarboxylic acid derivatives include aromatic dicarboxylic acids introduced with a substituent, such as alkyl, alkoxy, or a halogen, e.g., chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

As examples of alicyclic dicarboxylic acid compounds (a), there can be mentioned alicyclic dicarboxylic acids and derivatives thereof. Examples of alicyclic dicarboxylic acids include trans-1,4-cyclohexanedicarboxylic acid, cis-1,4-cyclohexanedicarboxylic acid, and 1,3-cyclohexanedicarboxylic acid. Examples of alicyclic dicarboxylic acid derivatives include alicyclic dicarboxylic acids introduced with a substituent(s), such as alkyl, alkoxy, or a halogen, e.g., trans-1,4-(2-methyl)cyclohexanedicarboxylic acid and trans-1,4-(2-chloro)cyclohexanedicarboxylic acid.

As examples of aromatic hydroxycarboxylic acid compounds (b), there can be mentioned aromatic hydroxycarboxylic acids and derivatives thereof. Examples of aromatic hydroxycarboxylic acids include 4-hydroxybenzoic acid, 3-hydroxybenzoic acid, 6-hydroxy-2-naphthoic acid, and 6-hydroxy-1-naphthoic acid. Examples of aromatic hydroxycarboxylic acid derivatives include aromatic hydroxycarboxylic acids introduced with a substituent(s), such as alkyl, alkoxy, or a halogen, e.g., 3-methyl-4hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6hydroxy-5-methyl-2-naphthoic acid, 6-hydroxy-5-methoxy-2-naphthoic acid, 2-chloro-4-hydroxybenzoic acid, 3-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

As examples of aromatic diol compounds (c), there can be mentioned aromatic diols and derivatives thereof. Examples of aromatic diols include 4,4'-dihydroxydiphenyl, 3,3'-dihydroxydiphenyl, 4,4'-dihydroxytriphenyl, hydroquinone, resorcin, 2,6-naphthalenediol, 4,4'-dihydroxydiphenyl ether, bis(4-hydroxyphenoxy)ethane, 3,3'-dihydroxydiphenyl ether, 1,6-naphthalenediol, 2,2-bis(4-hydroxyphenyl)propane, and bis(4-hydroxyphenyl)methane. Examples of aromatic diol derivatives include aromatic diols introduced with a substituent(s), such as alkyl, alkoxy, or a halogen, e.g., chlorohydroquinone, methylhydroquinone, t-butylhydroquinone, phenylhydroquinone, methoxyhydroquinone, phenoxyhydroquinone, 4-chlororesorcin, and 4-methylresorcin.

As examples of alicyclic diol compounds (c), there can be mentioned alicyclic diols and derivatives thereof. Examples of alicyclic diols include trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, and trans-1,3-cyclohexanedimethanol. Examples of alicyclic diol derivatives include alicyclic diols introduced with a substituent(s), such as alkyl, alkoxy, or a halogen, e.g., trans-1,4-(2-methyl)cyclohexanediol and trans-1,4-(2-chloro)cyclohexanediol.

Examples of aliphatic diol compounds (c) include linear or branched aliphatic diols, such as ethylene glycol, 1,3-propanediol, 1,4-butanediol, and neopentyl glycol.

Examples of aromatic dithiol compounds (d) include benzene-1,4-dithiol, benzene-1,3-dithiol, 2,6-naphthalenedithiol, and 2,7-naphthalenedithiol.

Examples of aromatic thiophenol compounds (d) include 4-mercaptophenol, 3-mercaptophenol, and 6-mercaptophenol.

Examples of aromatic thiolcarboxylic acid compounds (d) include 4-mercaptobenzoic acid, 3-mercaptobenzoic acid, 6-mercapto-2-naphthoic acid, and 7-mercapto-2-naphthoic acid.

Examples of aromatic hydroxyamine compounds (e) include 4-aminophenol, N-methyl-4-aminophenol, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenylmethane, 4amino-4'-hydroxydiphenyl sulfide, and 4,4'-ethylenedianiline.

Examples of aromatic diamine compounds (e) include 1,4-phenylenediamine, N-methyl-1,4-phenylenediamine, N,N'-dimethyl-1,4-phenylenediamine, 4,4'-diaminophenyl sulfide (thiodianiline), 4,4'-diaminodiphenyl sulfone, 2,5-diaminotoluene, 4,4'-diaminodiphenoxyethane, 4,4'-diaminodiphenylmethane (methylenedianiline), and 4,4'-diaminodiphenyl ether (oxydianiline).

As examples of thermotropic liquid crystalline polyester amides, there can be wholly aromatic polyester amides (B). The wholly aromatic polyester amides, for example, include two or more constituents selected from the following substances: an aromatic diamine, an aromatic dicarboxylic acid, an aromatic diol, an aromatic aminocarboxylic acid, an aromatic oxycarboxylic acid, an aromatic oxyamino compound, and a derivative thereof.

The thermotropic liquid crystalline polymer used in the present invention comprises preferably at least one polymer selected from wholly aromatic polyester (A) and wholly aromatic polyester amide (B), more preferably wholly aromatic polyester (A) so as to readily obtain a thermally conductive polymer molded article with high thermal conductivity ($\lambda_1$).

For improving the thermally conductive composition in heat resistance and moldability, a small amount of other polymers can be incorporated into the thermotropic liquid crystalline composition. Examples of other polymers include polyethylene terephthalate, polybutylene terephthalate, polyethylene naphthalate, polyallylate, polyester carbonate, polycarbonate, polyimide, polyether imide, polyamide, polyurethane, polyester elastomers, polystyrene, acrylic polymers, polysulfone, silicone polymers, halogen polymers, and olefin polymers.

The thermotropic liquid crystalline composition further may contain a small amount of a pigment, a dye, a fluorescent brightener, a dispersant, a stabilizer, an ultraviolet absorber, an energy quencher, an antistatic agent, an antioxidant, a flame retardant, a heat stabilizer, a lubricant, a plasticizer, or a solvent, if desired.

Further, a small amount of thermal conductive filler can be incorporated into the thermotropic liquid crystalline composition in order to improve the thermal conductive polymer molded article in thermal conductivity. Examples of thermal conductive filler include metals, metal oxides, metal nitrides, metal carbides, metal hydroxides, metal-coated resins, carbon fiber, graphitized carbon fiber, natural graphite, synthetic graphite, spherical graphite particles, mesocarbon microbeads, whisker carbon, microcoiled carbon, nanocoiled carbon, carbon nanotube, and carbon nanohorn. Examples of metals include silver, copper, gold, platinum, and zircon; examples of metal oxides include aluminum oxide and magnesium oxide; examples of metal nitrides include boron nitride, aluminum nitride, and silicon nitride; examples of metal carbides include silicon carbide; and examples of metal hydroxides include aluminum hydroxide. The amount of the thermal conductive filler incorporated is preferably 5 parts by weight or less, more preferably 1 part by weight or less, relative to 100 parts by weight of the thermotropic liquid crystalline polymer. When the thermal conductive filler is incorporated into the thermotropic liquid crystalline polymer, the resultant thermal conductive polymer molded article can be improved in the thermal conductivity ($\lambda_1$). However, the density of the thermal conductive polymer molded article is increased, whereas the electrical insulation properties may deteriorate. Therefore, for preventing such a problem, it is preferred that the thermotropic liquid crystalline composition contains substantially no thermal conductive filler. Further, it is most preferred that the thermal conductive polymer molded article is obtained from solely the thermotropic liquid crystalline polymer.

Next, the thermal conductive polymer molded article is described.

In order to obtain the thermal conductive polymer molded article from a thermotropic liquid crystalline polymer or a thermotropic liquid crystalline composition, the thermotropic liquid crystalline polymer or thermotropic liquid crystalline composition is melted by heating by means of a molding machine and a magnetic field or an electric field is applied thereto by means of a magnetic field generating apparatus or an electric field generating apparatus so that the rigid molecular chains of the thermotropic liquid crystalline polymer are oriented in a predetermined direction in a well-controlled manner. Then, the thermotropic liquid crystalline polymer or thermotropic liquid crystalline composition is solidified by cooling so that the thermotropic liquid crystalline polymer or thermotropic liquid crystalline composition has a predetermined thermal conductivity ($\lambda_1$) to obtain a thermal conductive polymer molded article.

Examples of magnetic field generating apparatuses (or magnetic field generating means) include a permanent magnet, an electromagnet, a superconducting magnet, and a coil. Higher magnetic flux density of the magnetic field generated by the magnetic field generating means increases the degree of orientation of the rigid molecular chains of the thermotropic liquid crystalline polymer, providing a higher thermal conductivity ($\lambda_1$) to the obtained thermally conductive polymer molded article. The magnetic flux density of the magnetic field to be applied is preferably between 1 and 20 teslas (T), more preferably between 2 and 20 T, most preferably between 3 and 20 T. When the magnetic flux density is less than 1 T, orientation of the rigid molecular chains of the thermotropic liquid crystalline may be unsatisfactory, making it difficult to obtain a thermally conductive polymer molded article having a higher thermal conductivity ($\lambda_1$). On the other hand, it is practically difficult to obtain a magnetic field having a magnetic flux density of higher than 20 T. When the magnetic flux density is in the range of from 3 to 20 T, thermally conductive polymer molded article having a higher thermal conductivity ($\lambda_1$) can be obtained and the magnetic flux density in such a range is practical.

Examples of molding machines that can be used include a machine for hot molding a synthetic resin, such as an injection molding machine, an extrusion machine, or a press molding machine. The thermotropic liquid crystalline polymer or the thermotropic liquid crystalline composition can be molded into thermally conductive polymer molded articles having various forms, such as a sheet, a film, a block, a particle, and a fiber. The thermally conductive polymer molded article can be used in printed circuit boards, semiconductor packages, housings, and radiating members, such as heat pipes, radiating panels, and heat diffusion panels to conduct the heat generated by various electronic parts and dissipate the heat out of the electronic equipment.

When the molecular chains of the thermotropic liquid crystalline polymer are oriented in a predetermined direction, the thermal conductivity ($\lambda_1$) of the thermal conductive polymer molded article is extremely large in the direction of the molecular chains. Hereinafter, this thermal conductivity ($\lambda_1$) is referred to as "first thermal conductivity ($\lambda_1$)", and it is preferably between 0.7 and 20 W/(m·K), more preferably between 1.0 and 10 W/(m·K), most preferably between 2.0 and 10 W/(m·K). When the first thermal conductivity ($\lambda_1$) is less than 0.7 W/(m·K), effective transfer of heat generated from the electronic parts to the outside may be difficult. On the other hand, it is difficult to obtain a thermal conductive polymer molded article having a first thermal conductivity ($\lambda_1$) of more than 20 W/(m·K), taking into consideration the physical properties of the thermotropic liquid crystalline polymer.

In contrast, a conventionally molded article obtained by molding a thermotropic liquid crystalline polymer without applying a magnetic field or an electric field to the thermotropic liquid crystalline polymer has a thermal conductivity ($\lambda_2$) (hereinafter, referred to as "second thermal conductivity ($\lambda_2$)") of at most about 0.5 W/(m·K). In the present embodiment, the first thermal conductivity ($\lambda_1$) of the thermal conductive polymer molded article is higher than the second thermal conductivity ($\lambda_2$) of the molded article formed by molding the thermotropic liquid crystalline polymer without applying a magnetic or electric field. The conventionally molded article formed by molding the thermotropic liquid crystalline polymer is a molded article that is molded by substantially the same molding method under substantially the same conditions as those for the thermal conductive polymer molded article according to the present embodiment except that a magnetic field or an electric field is not applied to the thermotropic liquid crystalline polymer. The difference in thermal conductivity ($\lambda_1 - \lambda_2$) between the thermal conductive polymer molded article and the conventionally molded article is preferably between 0.2 and 19.8 W/(m·K), more preferably between 0.5 and 9.8 W/(m·K), most preferably between 1.5 and 9.8 W/(m·K). When the difference in thermal conductivity ($\lambda_1 - \lambda_2$) is less than 0.2 W/(m·K), the thermal conductivity may be unsatisfactory. On the other hand, it is difficult to obtain a thermal conductive polymer molded article having a difference in thermal conductivity ($\lambda_1 - \lambda_2$) of more than 19.8 W/(m·K), taking into consideration the physical properties of the thermotropic liquid crystalline polymer.

The thermal conductive polymer molded article according to the present embodiment has preferably a density of 1.10 to less than 1.50 g/cm³, more preferably 1.20 to less than 1.50 g/cm³, most preferably 1.20 to less than 1.45 g/cm³. When the density of the thermal conductive polymer molded article is 1.50 g/cm3 or more, reduction in weight of an object to which the thermal conductive polymer molded article is applied, for example, an electronic appliance, may be difficult. On the other hand, it is difficult to obtain a thermal conductive polymer molded article having a density of less than 1.10, taking into consideration the physical properties of the thermotropic liquid crystalline polymer.

The thermal conductive polymer molded article according to the present embodiment has preferably a volume resistivity of between $1\times10^6$ and $1\times10^{20}$ Ω·cm, more preferably between $1\times10^8$ and $1\times10^{18}$ Ω·cm, most preferably between $1\times10^{12}$ and $1\times10^{18}$ Ω·cm. When the volume resistivity of the molded article is less than $1\times10^6$ Ω·cm, the electrical insulation properties obtained may be unsatisfactory. On the other hand, it is difficult to obtain a thermal conductive polymer molded article having a volume resistivity of more than $1\times10^{20}$ Ω·cm, taking into consideration the physical properties of the liquid crystalline polymer.

When the thermal conductive polymer molded article according to the present embodiment is molded into a sheet form, the sheet has preferably a thickness of between 0.02 and 10 mm, more preferably between 0.1 and 7 mm, most preferably between 0.2 and 5 mm. When the thickness of the sheet is less than 0.02 mm, handling of the thermal conductive polymer molded article may be burdensome when the molded article is used in an application object, such as an electronic appliance. On the other hand, when the thickness of the sheet exceeds 10 mm, reduction in weight of, for example, an electronic appliance may be difficult.

Next, a method for producing a thermal conductive polymer molded article according to one embodiment will be described in detail with reference to FIGS. 1 to 3. Thermal conductive sheet 11 in a sheet form shown in FIG. 1, which is obtained as the thermal conductive polymer molded article of the present invention, can be applied to printed wiring board and electronic appliance as a radiating member, such as a radiating sheet.

Firstly, an explanation is made on the case where the molecular chains of the thermotropic liquid crystalline polymer are oriented in the thickness direction of thermally conductive sheet 11. In this case, the direction of the rigid molecular chains of the thermotropic liquid crystalline polymer is aligned with the thickness direction of thermally conductive sheet 11 (the direction of Z axis in FIG. 1).

Figure 2:
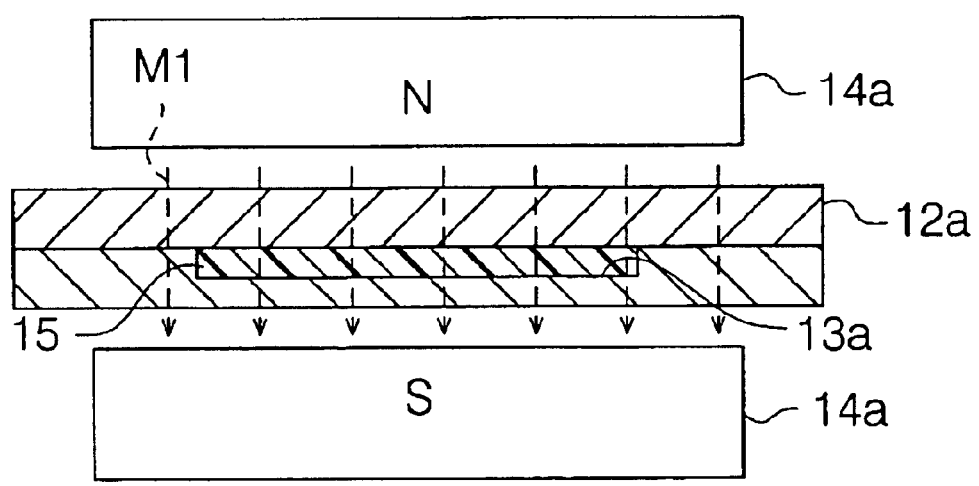
FIG. 2 is a conceptual view showing a method for producing a thermally conductive sheet of the present invention, which has high thermal conductivity in a direction along the thickness of the sheet.

As shown in FIG. 2, a cavity 13*a* having a shape corresponding to the sheet is formed in a mold 12*a*. A pair of permanent magnets 14*a* is disposed as a magnetic field generating apparatus above and under the mold 12*a*. The direction of magnetic lines of force M1 of the magnetic field generated by permanent magnets 14*a* is parallel to the thickness direction of the cavity 13*a*.

First, the cavity 13*a* is filled with a thermotropic liquid crystalline composition 15 in a molten state. The mold 12*a* has a heating apparatus (not shown) to keep in a molten state the thermotropic liquid crystalline composition 15 contained in the cavity 13*a*. After filling the cavity 13*a* with the thermotropic liquid crystalline composition 15, and while being molded by heating, a magnetic field is applied to the composition 15 by means of the permanent magnets 14*a*. In this instance, the direction of magnetic lines of force M1 is parallel to the thickness direction of the thermotropic liquid crystalline composition 15 in a sheet form, so that the rigid molecular chains of the thermotropic liquid crystalline polymer can be oriented in the thickness direction of the thermotropic liquid crystalline composition 15 in a sheet form. The thus-oriented thermotropic liquid crystalline composition 15 is solidified by cooling, and then is removed from the mold 12*a* to obtain a thermal conductive sheet 11 in which the rigid molecular chains in the thermotropic liquid crystalline composition 15 are oriented in the thickness direction. From the first thermal conductivity ($\lambda_1$), the thermal conductive sheet 11 has preferably a thermal conductivity ($\lambda_{1T}$) in the thickness direction of between 0.7 and 20 W/(m·K), more preferably between 1.0 and 10 W/(m·K), most preferably between 2.0 and 10 W/(m·K). The thermal conductive sheet 11 can be used in, for example, a circuit board material and a radiating sheet for use in semiconductor package, which require excellent thermal conductivity in the thickness direction.

Next, a method for producing a thermal conductive polymer molded article according to another embodiment of the present invention is described. In this another embodiment, the direction of the rigid molecular chains of the thermotropic liquid crystalline polymer is aligned with the direction parallel to the surface of the thermal conductive sheet 11, i.e., the direction of X axis and the direction of Y axis in FIG. 1.

Figure 3:
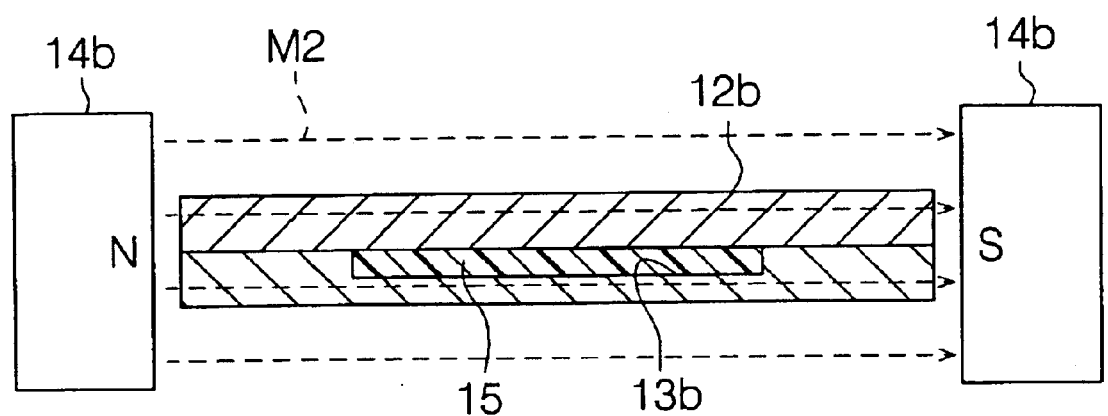
FIG. 3 is a conceptual view showing a method for producing a thermally conductive sheet of the present invention, which has high thermal conductivity in the direction parallel to the surface of the sheet.

As shown in FIG. 3, a pair of permanent magnets 14b are disposed on either side of a mold 12b so that magnetic lines of force M2 pass in the direction parallel to the bottom surface of a cavity 13b of the mold 12b having a form corresponding to the sheet to be formed. A magnetic field is applied by means of the permanent magnets 14b to a thermotropic liquid crystalline composition 15 contained in the cavity 13b having the thermotropic liquid crystalline polymer melted by heating. In this instance, the direction of magnetic lines of force M2 is parallel to the surface of thermotropic liquid crystalline composition 15 in a sheet form, so that the rigid molecular chains of the thermotropic liquid crystalline polymer can be oriented in the direction parallel to the surface of the thermotropic liquid crystalline composition 15. The thermotropic liquid crystalline composition 15 in the oriented state is solidified by cooling, and then removed from the mold 12b to obtain a thermal conductive sheet 11 in which the rigid molecular chains of the thermotropic liquid crystalline polymer are oriented in the direction parallel to the surface of the sheet. Due to the first thermal conductivity ($\lambda_1$), the thermal conductive sheet 11 has preferably a thermal conductivity ($\lambda_{1P}$) in the direction parallel to the surface of thermal conductive sheet 11 of between 0.7 and 20 W/(m·K), more preferably between 1.0 and 10 W/(m·K), most preferably between 2.0 and 10 W/(m·K). The thermal conductive sheet 11 can be used in, for example, a circuit board material and a radiating sheet for use in semiconductor package, which require excellent thermal conductivity in the direction parallel to the surface of the sheet.

In production of the thermal conductive polymer molded article, the thermotropic liquid crystalline polymer or thermotropic liquid crystalline composition is melted by heating, and a magnetic field or an electric field is applied to the thermotropic liquid crystalline polymer or thermotropic liquid crystalline composition. Then, the thermotropic liquid crystalline polymer or thermotropic liquid crystalline composition is solidified by cooling so that the first thermal conductivity ($\lambda_1$) becomes a predetermined value to obtain a thermal conductive polymer molded article. In this instance, the rigid molecular chains of the thermotropic liquid crystalline polymer are controlled so as to be oriented in the direction parallel to the magnetic lines of force. Thus, the resultant thermal conductive polymer molded article has an improved thermal conductivity.

The thermotropic liquid crystalline composition comprises substantially solely a thermotropic liquid crystalline polymer and contains no thermal conductive filler. When the thermotropic liquid crystalline composition contains a thermal conductive filler, the resultant molded article is improved in thermal conductivity. However, when the thermal conductive filler content is increased, the density of the molded article is increased. The thermal conductive polymer molded article according to the present embodiment contains substantially no thermal conductive filler, and hence advantageous features of the thermotropic liquid crystalline polymer, for example, low density can be satisfactorily utilized.

Advantages achieved by the present embodiment are as follows.

The thermal conductive polymer molded article according to the present embodiment is obtained from a thermotropic liquid crystalline composition comprised mainly of a thermotropic liquid crystalline polymer. In this thermal conductive polymer molded article, a magnetic field or an electric field is applied to the thermotropic liquid crystalline composition melted by heating so that the rigid molecular chains of the thermotropic liquid crystalline polymer are controlled in a predetermined direction and oriented. The thermal conductive polymer molded article is formed so that the first thermal conductivity ($\lambda_1$) of the thermal conductive polymer molded article is higher than the second thermal conductivity ($\lambda_2$) of a molded article formed by molding the thermotropic liquid crystalline polymer. Therefore, it is not necessary to incorporate a thermal conductive filler into the thermotropic liquid crystalline composition, or an extremely small amount of the thermal conductive filler can be incorporated. Thus, not only can advantageous features of the thermotropic liquid crystalline polymer including electrical insulation properties and low density be satisfactorily utilized, but also a thermal conductive polymer molded article having excellent thermal conductivity can be obtained.

The thermal conductive polymer molded article according to the present embodiment is obtained from solely a thermotropic liquid crystalline polymer, and has a thermal conductivity ($\lambda_1$) of between 0.7 and 20 W/(m·K). Alternatively, the thermal conductive polymer molded article according to the present embodiment is obtained from a thermotropic liquid crystalline composition, which comprises 100 parts by weight of a thermotropic liquid crystalline polymer and 5 parts by weight or less of thermal conductive filler, and has a thermal conductivity ($\lambda_1$) of between 0.7 and 20 W/(m·K). Thus, not only can advantageous features of the thermotropic liquid crystalline polymer including electrical insulation properties and low density be satisfactorily utilized, but also a thermal conductive polymer molded article having excellent thermal conductivity can be obtained.

In another embodiment of the present invention, the thermotropic liquid crystalline polymer contained in the thermal conductive polymer molded article comprises at least one member selected from (A) wholly aromatic polyester and (B) wholly aromatic polyester amide. These thermotropic liquid crystalline polymers readily exhibit the optical anisotropic molten phase, as well as excellent moldability, and can be easily molded into various forms. Therefore, a thermal conductive polymer molded article having a high first thermal conductivity ($\lambda_1$) can be easily obtained.

The thermal conductive polymer molded article according to one embodiment of the present invention has a density of 1.10 to less than 1.50 g/cm$^3$. Therefore, it can suppress an increase in weight when used in, for example, an electronic appliance.

The thermal conductive polymer molded article according to another embodiment of the present invention is molded into a sheet form as a thermal conductive sheet, and the thermal conductive sheet has a thermal conductivity ($\lambda_{1T}$) of between 0.7 and 20 W/(m·K) in the thickness direction. The thermal conductive polymer molded article having such a construction can be readily used in the application having a sheet form and requiring excellent thermal conductivity in the thickness direction, for example, a circuit board material and a radiating sheet.

In the thermal conductive polymer molded article according to another embodiment of the present invention, when the magnetic flux density of the magnetic field generated by a magnetic field generating apparatus is increased, the rigid molecular chains of the thermotropic liquid crystalline polymer can be oriented, so that a thermal conductive polymer molded article can be obtained having a higher thermal conductivity ($\lambda_1$) Thus, by changing the magnetic flux density of the magnetic field, thermal conductive polymer molded articles can be easily obtained having various thermal conductivities ($\lambda_1$).

In the method for producing a thermal conductive polymer molded article according to one embodiment of the present invention, a thermotropic liquid crystalline polymer or a thermotropic liquid crystalline composition is melted by heating, and a magnetic field is applied by means of a magnetic field generating apparatus to the thermotropic liquid crystalline polymer or thermotropic liquid crystalline composition melted by heating. Then, the thermotropic liquid crystalline polymer or thermotropic liquid crystalline composition is solidified by cooling to produce a thermal conductive polymer molded article. According to this production method, not only advantageous features of the thermotropic liquid crystalline polymer can be satisfactorily utilized, including electrical insulation properties and low density, but also a thermal conductive polymer molded article can be easily obtained having excellent thermal conductivity.

In the method for producing a thermal conductive polymer molded article according to the present embodiment, the thermotropic liquid crystalline polymer or thermotropic liquid crystalline composition is melted by heating into a sheet form, and a magnetic field is applied to the sheet in the thickness direction by means of a magnetic field generating apparatus. This method is advantageous in that a thermal conductive polymer molded article can be easily obtained having a sheet form and having high thermal conductivity in the thickness direction of the sheet.

Next, the embodiments will be described in more detail with reference to the following Examples and Comparative Examples.

EXAMPLE 1

Pellets of wholly aromatic polyester (Rodrun LC5000, manufactured by UNITIKA LTD.; constituent units: terephthalic acid, 4-hydroxybenzoic acid, and ethylene glycol) as a thermotropic liquid crystalline polymer were dehumidified and dried, and subjected to injection molding to prepare a molded article in the form of sheet having a size of 50 mm (length)×50 mm (width)×2 mm (thickness). The sheet-form molded article prepared was placed in a cavity heated to 340° C., and melted while applying thereto a magnetic field at a magnetic flux density of 2.5 T. In this instance, the magnetic field was adjusted so that the direction of the magnetic lines of force was parallel to the thickness direction of the sheet-form molded article. The resultant sheet-form molded article was held in the magnetic field for 20 minutes, and then solidified by cooling to room temperature to produce a thermal conductive sheet having a thickness of 2 mm, thus obtaining a thermal conductive polymer molded article.

EXAMPLES 2 TO 4

Wholly aromatic polyester was subjected to injection molding in the same manner as in Example 1 to prepare a sheet-form molded article. Thermal conductive polymer molded articles were individually produced in accordance with substantially the same procedure as in Example 1 except that the magnetic flux density was individually changed to 5 T, 10 T, and 15 T.

COMPARATIVE EXAMPLE 1

A sheet-form molded article was prepared in the same manner as in Example 1. The sheet-form molded article prepared was placed in a cavity heated to 340° C. and melted without applying a magnetic field. The sheet-form molded article was kept in a molten state for 20 minutes, and then solidified by cooling to room temperature to produce a thermotropic liquid crystalline polymer molded article having a thickness of 2 mm.

COMPARATIVE EXAMPLE 2

To 100 parts by weight of wholly aromatic polyester (Rodrun LC5000, manufactured by UNITIKA LTD.; constituent units: terephthalic acid, 4-hydroxybenzoic acid, and ethylene glycol) were mixed 30 parts by weight of aluminum oxide powder (manufactured by SHOWA DENKO K.K.) and 5 parts by weight of boron nitride (manufactured by Denki Kagaku Kogyo Kabushiki Kaisha) as a thermal conductive filler to prepare a composition. The composition was placed in an extruder and melt-kneaded to prepare pellets. The pellets were dehumidified and dried, and subjected to injection molding to prepare a molded article in the form of sheet having a size of 50 mm (length)×50 mm (width)×2 mm (thickness). The sheet-form molded article prepared was placed in a cavity heated to 340° C. and melted without applying a magnetic field. The sheet-form molded article was kept in a molten state for 20 minutes, and then solidified by cooling to room temperature to produce a thermal conductive polymer molded article having a thickness of 2 mm.

COMPARATIVE EXAMPLE 3

To 100 parts by weight of wholly aromatic polyester (Rodrun LC5000, manufactured by UNITIKA LTD.; constituent units: terephthalic acid, 4-hydroxybenzoic acid, and ethylene glycol) as a thermotropic liquid crystalline polymer were mixed 80 parts by weight of spherical graphite particles (manufactured by Osaka Gas Chemicals Co., Ltd.) and 20 parts by weight of carbon fiber powder (manufactured by PETOCA MATERIALS LTD.) as a thermal conductive filler to prepare a composition. The composition was placed in an extruder and melt-kneaded to prepare pellets. The pellets were dehumidified and dried, and subjected to injection molding to prepare a molded article in the form of sheet having a size of 50 mm (length)×50 mm (width)×2 mm (thickness). The sheet-form molded article prepared was placed in a cavity heated to 340° C. and melted without applying a magnetic field. The sheet-form molded article was kept in a molten state for 20 minutes, and then solidified by cooling to room temperature to produce a thermal conductive polymer molded article having a thickness of 2 mm.

With respect to each of the thermal conductive polymer molded articles and thermotropic liquid crystalline polymer molded article obtained in Examples 1 to 4 and Comparative Examples 1 to 3, a density was measured in accordance with the method described in ASTM D-792 "Standard Test Methods for Density and Specific Gravity (Relative Density) of Plastics by Displacement". In addition, with respect to each of the thermal conductive polymer molded articles and thermotropic liquid crystalline polymer molded article, a thermal conductivity was measured by a laser flash method. Further, regarding the electrical conductivity, a volume resistivity was measured in accordance with the method described in ASTM D-257.

The results of Examples 1 to 4 are shown in Table 1, and the results of Comparative Examples 1 to 3 are shown in Table 2.

TABLE 1

| | Examples | | | |
|---|---|---|---|---|
| | 1 | 2 | 3 | 4 |
| Formulation (Part by weight) | | | | |
| Thermotropic liquid crystalline polymer | 100 | 100 | 100 | 100 |
| Aluminum oxide | 0 | 0 | 0 | 0 |
| Boron nitride | 0 | 0 | 0 | 0 |
| Spherical graphite particles | 0 | 0 | 0 | 0 |
| Carbon fiber | 0 | 0 | 0 | 0 |
| Measured values | | | | |
| Magnetic flux density (T) | 2.5 | 5.0 | 10.0 | 15.0 |
| Density (g/cm$^3$) | 1.39 | 1.40 | 1.39 | 1.39 |
| Thermal conductivity [W/(m · K)] | 0.87 | 1.20 | 1.71 | 2.48 |
| Volume resistivity (Ω · cm) | $5 \times 10^{16}$ | $5 \times 10^{16}$ | $5 \times 10^{16}$ | $5 \times 10^{16}$ |

TABLE 2

| | Comparative Examples | | |
|---|---|---|---|
| | 1 | 2 | 3 |
| Formulation (Part by weight) | | | |
| Thermotropic liquid crystalline polymer | 100 | 100 | 100 |
| Aluminum oxide | 0 | 30 | 0 |
| Boron nitride | 0 | 5 | 0 |
| Spherical graphite particles | 0 | 0 | 80 |
| Carbon fiber | 0 | 0 | 20 |
| Measured values | | | |
| Magnetic flux density (T) | 0 | 0 | 0 |
| Density (g/cm$^3$) | 1.40 | 1.67 | 1.75 |
| Thermal conductivity [W/(m · K)] | 0.26 | 0.72 | 1.22 |
| Volume resistivity (Ω · cm) | $5 \times 10^{16}$ | $5 \times 10^{16}$ | $2 \times 10^{-1}$ |

As can be seen from Table 1, each of the thermal conductive polymer molded articles in Examples 1 to 4 has such excellent thermal conductivity that the first thermal conductivity ($\lambda_1$) is 0.7 W/(m·K) or higher.

In addition, it is found that each thermal conductive polymer molded article contains no thermal conductive filler, and has a density as small as the density (1.39 g/cm$^3$) of the thermotropic liquid crystalline polymer. It is found that each thermal conductive polymer molded article contains no thermal conductive filler, and has such excellent electrical insulation properties that the volume resistivity is as high as the volume resistivity (5×10$^6$ Ω·cm) of the thermotropic liquid crystalline polymer. Further, from the correlation between the magnetic flux density and the first thermal conductivity ($\lambda_1$) in Examples 1 to 4, it is found that the first thermal conductivity ($\lambda_1$) is improved proportionally as the magnetic flux density increases.

As can be seen from Table 2, it is found that the thermotropic liquid crystalline polymer molded article in Comparative Example 1 has a small density and a high volume resistivity, but it has a second thermal conductivity ($\lambda_2$) of less than 0.30 W/(m·K) and hence has almost no thermal conductivity. The thermal conductive polymer molded article in Comparative Example 2 contains aluminum oxide and boron nitride having electrical insulation properties as a thermal conductive filler. Therefore, the thermal conductivity and volume resistivity of the molded article are high values, but the density is high, inhibiting reduction in weight of an object to which the thermal conductive polymer molded article is applied. The thermal conductive polymer molded article in Comparative Example 3 contains spherical graphite particles and carbon fiber powder having electrical conductivity as thermal conductive filler. Therefore, the thermal conductivity of the thermal conductive polymer molded article is high, but the volume resistivity is as low as less than 10$^7$ Ωcm and thus satisfactory electrical insulation properties cannot be obtained. Also, the density is high.

The embodiment can be changed in construction as follows.

A pair of permanent magnets is disposed so that a mold is placed between the magnets, but one of the permanent magnets may be omitted.

A pair of south pole magnets or a pair of north pole magnets may be disposed so that the pair oppose to each other.

An adhesive layer may be provided on at least one side of the thermal conductive sheet, so that the thermal conductive sheet can be easily fixed.

In the above embodiment, a magnetic field is applied to the thermotropic liquid crystalline polymer or thermotropic liquid crystalline composition so that the molecular chains of the thermotropic liquid crystalline polymer are oriented in a predetermined direction. As an alternative method, an electric field may be applied by means of an electric field generating apparatus having electrodes and a variable autotransformer to the molten thermotropic liquid crystalline polymer or thermotropic liquid crystalline composition so that the molecular chains of the thermotropic liquid crystalline polymer are oriented in a predetermined direction. However, from the viewpoint of facilitating efficient orientation of the molecular chains and controlling of the orientation, it is preferred to apply a magnetic field by means of a magnetic field generating apparatus.

It should be apparent to those skilled in the art that the present invention may be embodied in many other specific forms without departing from the spirit or scope of the invention. Particularly, it should be understood that the invention may be embodied in the following forms.

What is claimed is:

1. A thermal conductive polymer molded article formed by molding a thermotropic liquid crystalline composition comprised mainly of a thermotropic liquid crystalline polymer, wherein the thermal conductive polymer molded article is formed by applying a field selected from the group consisting of a magnetic field and an electric field to the thermotropic liquid crystalline composition melted by heating so that the thermal conductive polymer molded article has a first thermal conductivity ($\lambda_1$) higher than a second thermal conductivity ($\lambda_2$) of a molded article formed by molding the thermotropic liquid crystalline polymer without said application of a magnetic field or an electric field.

2. The thermal conductive polymer molded article according to claim 1, wherein the thermotropic liquid crystalline composition consists solely of the thermotropic liquid crystalline polymer.

3. The thermal conductive polymer molded article according to claim 1, wherein the thermotropic liquid crystalline composition comprises 100 parts by weight of the thermotropic liquid crystalline polymer and 5 parts by weight or less of a thermal conductive filler relative to the thermotropic liquid crystalline polymer.

4. The thermal conductive polymer molded article according to claim 1, wherein the thermal conductive polymer molded article has the first thermal conductivity ($\lambda_1$) of between 0.7 and 20 W/(m·K).

5. The thermal conductive polymer molded article according to claim 1, wherein the thermotropic liquid crystalline polymer comprises at least one polymer selected from the group consisting of (A) a wholly aromatic polyester and (B) a wholly aromatic polyester amide.

6. The thermal conductive polymer molded article according to claim 1, wherein the molded article has a density of 1.10 to less than 1.50 g/cm$^3$.

7. The thermal conductive polymer molded article according to claim 1, wherein the thermal conductive polymer molded article is in a sheet form and has a thermal conductivity ($\lambda_{1T}$) of between 0.7 and 20 W/(m·K) in the thickness direction of the sheet.

8. The thermal conductive polymer molded article according to claim 1, wherein the difference ($\lambda_1 - \lambda_2$) between the first thermal conductivity ($\lambda_1$) and the second thermal conductivity ($\lambda_2$) is between 0.2 and 19.8 W/(m·K).

9. The thermal conductive polymer molded article according to claim 1, wherein said thermal conductive polymer molded article is in a sheet form and has a thermal conductivity ($\lambda_{1P}$) of between 0.7 and 20 W/(m·K) in the direction parallel to the surface of the sheet.

10. A method for producing a thermal conductive polymer molded article, the method comprising steps of:
melting by heating a polymer selected from the group consisting of a thermotropic liquid crystalline polymer and a thermotropic liquid crystalline composition;
applying a field, selected from the group consisting of a magnetic field and an electric field, to the melted polymer; and solidifying by cooling the melted polymer after the step of applying the field to the melted polymer.

11. The method for producing a thermal conductive polymer molded article according to claim 10, wherein the melting step comprises a step of molding the polymer into a sheet form, and the step of applying the field to the polymer comprises a step of applying the field in the thickness direction of the sheet form.

12. The method for producing a thermal conductive polymer molded article according to claim 10, wherein the melting step comprises a step of molding the polymer into a sheet form, and the step of applying the field to the polymer comprises a step of applying the field in the direction parallel to the surface of the sheet form.

13. A method for controlling a thermal conductive polymer molded article in thermal conductivity, the method comprising steps of: melting by heating a polymer selected from the group consisting of a thermaotropic liquid crystalline composition; and applying a field selected from the group consisting of a magnetic field and an electric field to the melted polymer, wherein the direction of the field is controlled to the direction in which the first thermal conductivity ($\lambda_1$) of the thermal conductive polymer molded article is improved.

* * * * *